(12) United States Patent
Chuang et al.

(10) Patent No.: US 7,953,086 B2
(45) Date of Patent: May 31, 2011

(54) COMPRESSION OF DATAGRAM DISTRIBUTION INFORMATION

(75) Inventors: Weitong Chuang, Sunnyvale, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 293 days.

(21) Appl. No.: 12/399,618

(22) Filed: Mar. 6, 2009

(65) Prior Publication Data

US 2009/0168777 A1 Jul. 2, 2009

Related U.S. Application Data

(63) Continuation-in-part of application No. 10/819,980, filed on Apr. 8, 2004, now Pat. No. 7,716,364.

(60) Provisional application No. 60/483,027, filed on Jun. 27, 2003, provisional application No. 60/529,620, filed on Dec. 16, 2003.

(51) Int. Cl.
*H04L 12/56* (2006.01)

(52) U.S. Cl. ........................ 370/390; 370/389

(58) Field of Classification Search .................. 370/389, 370/401, 390, 218, 365; 709/236, 223
See application file for complete search history.

(56) References Cited

U.S. PATENT DOCUMENTS

| | | | | |
|---|---|---|---|---|
| 5,999,528 A * | 12/1999 | Chow et al. | | 370/365 |
| 6,335,935 B2 * | 1/2002 | Kadambi et al. | | 370/396 |
| 6,553,028 B1 * | 4/2003 | Tang et al. | | 370/389 |
| 6,831,891 B2 | 12/2004 | Mansharamani et al. | | |
| 6,870,844 B2 | 3/2005 | Tuck et al. | | |
| 6,876,653 B2 * | 4/2005 | Ambe et al. | | 370/389 |
| 7,007,071 B1 | 2/2006 | Brown | | |
| 7,027,412 B2 * | 4/2006 | Miyamoto et al. | | 370/255 |
| 7,124,166 B2 | 10/2006 | Brown | | |
| 7,310,306 B1 * | 12/2007 | Cheriton | | 370/218 |
| 7,313,614 B2 * | 12/2007 | Considine et al. | | 709/223 |
| 7,324,513 B2 * | 1/2008 | Shankar et al. | | 370/390 |
| 7,421,612 B1 * | 9/2008 | Maranhao et al. | | 714/4 |
| 7,474,666 B2 * | 1/2009 | Kloth et al. | | 370/401 |
| 7,486,684 B2 * | 2/2009 | Chu et al. | | 370/401 |
| 7,561,571 B1 * | 7/2009 | Lovett et al. | | 370/392 |
| 7,606,229 B1 * | 10/2009 | Foschiano et al. | | 370/392 |
| 7,716,364 B2 | 5/2010 | Kishore et al. | | |
| 2002/0087976 A1 * | 7/2002 | Kaplan et al. | | 725/34 |
| 2002/0126671 A1 | 9/2002 | Ellis et al. | | |
| 2002/0199203 A1 * | 12/2002 | Duffy et al. | | 725/109 |
| 2004/0008716 A1 | 1/2004 | Stiliadis | | |
| 2004/0098501 A1 * | 5/2004 | Finn | | 709/236 |
| 2005/0021825 A1 * | 1/2005 | Kishore et al. | | 709/232 |
| 2005/0147095 A1 * | 7/2005 | Guerrero et al. | | 370/390 |

(Continued)

OTHER PUBLICATIONS

"Response to Final Office Action in U.S. Appl. No. 10/819,980 mailed on Feb. 2, 2009",15 pgs.

(Continued)

*Primary Examiner* — Thong H Vu (57) ABSTRACT

A first set of instructions associated with an egress of a datagram may be determined, the first set of instructions identifying a first subset of a second set of instructions, the first subset including multiple individual network identifiers identifying which network portion to transmit a replication of the datagram. Which one of the multiple individual network identifiers corresponds to the datagram may be determined from the first subset of the second set of instructions and may be based on the egress of the datagram, wherein each network identifier corresponds to a different egress. The replication of the datagram may be provided to the egress of the determined network identifier for transmission to the network portion as identified by the determined network identifier corresponding to the datagram.

20 Claims, 7 Drawing Sheets

U.S. PATENT DOCUMENTS

2006/0282839 A1* 12/2006 Hankins et al. ............... 719/318

OTHER PUBLICATIONS

"Final Office Action in U.S. Appl. No. 10/819,980 mailed on Oct. 7, 2008", 18 pgs.

"Response to Non-Final Office Action in U.S. Appl. No. 10/819,980, mailed on Jun. 6, 2008", 16 pgs.

"Non-Final Office in U.S. Appl. No. 10/819,980 mailed on Mar. 21, 2008", 19 pgs.

* cited by examiner

| 124 Second Instruction Table | | | |
|---|---|---|---|
| 302 Mode Field (1 bit) | 128A Egress Portion (9 bits) | 130A Replication Portion (64 bits) | 304 Next Field (15 bits) |
| 302 Mode Field (1 bit) | 306 Selection Field (4 bits) | 112A Network ID (15 bits) / 112B Network ID (15 bits) / 112C Network ID (15 bits) / 112D Network ID (15 bits) | 304 Next Field (15 bits) |

128B Egress Portion (9 bits) | 130B Replication Portion (5 bits)

COMPRESSION OF DATAGRAM DISTRIBUTION INFORMATION

CROSS REFERENCE TO RELATED APPLICATIONS

This application is a continuation in part of and claims priority to U.S. application Ser. No. 10/819,980, entitled "Internet Protocol Multicast Replication" filed on Apr. 8, 2004, which is hereby incorporated by reference in its entirety.

TECHNICAL FIELD

This description relates to the compression of datagram distribution information.

BACKGROUND

Networking involves transmitting packets between machines and across networks. Often times a single packet may be transmit to multiple locations, such as during a multicast or broadcast transmission. The packets may be routed or distributed by routers or other networking devices that include distribution information in look-up tables on how to distribute the incoming packets. With larger networks handling a wide variety of packets, the distribution information could quickly become voluminous and may require substantial storage space within the router or other networking device.

SUMMARY

An apparatus and method for the compression of datagram distribution information, substantially as shown in and/or described in connection with at least one of the figures, as set forth more completely in the claims.

DETAILED DESCRIPTION

Figure 1:
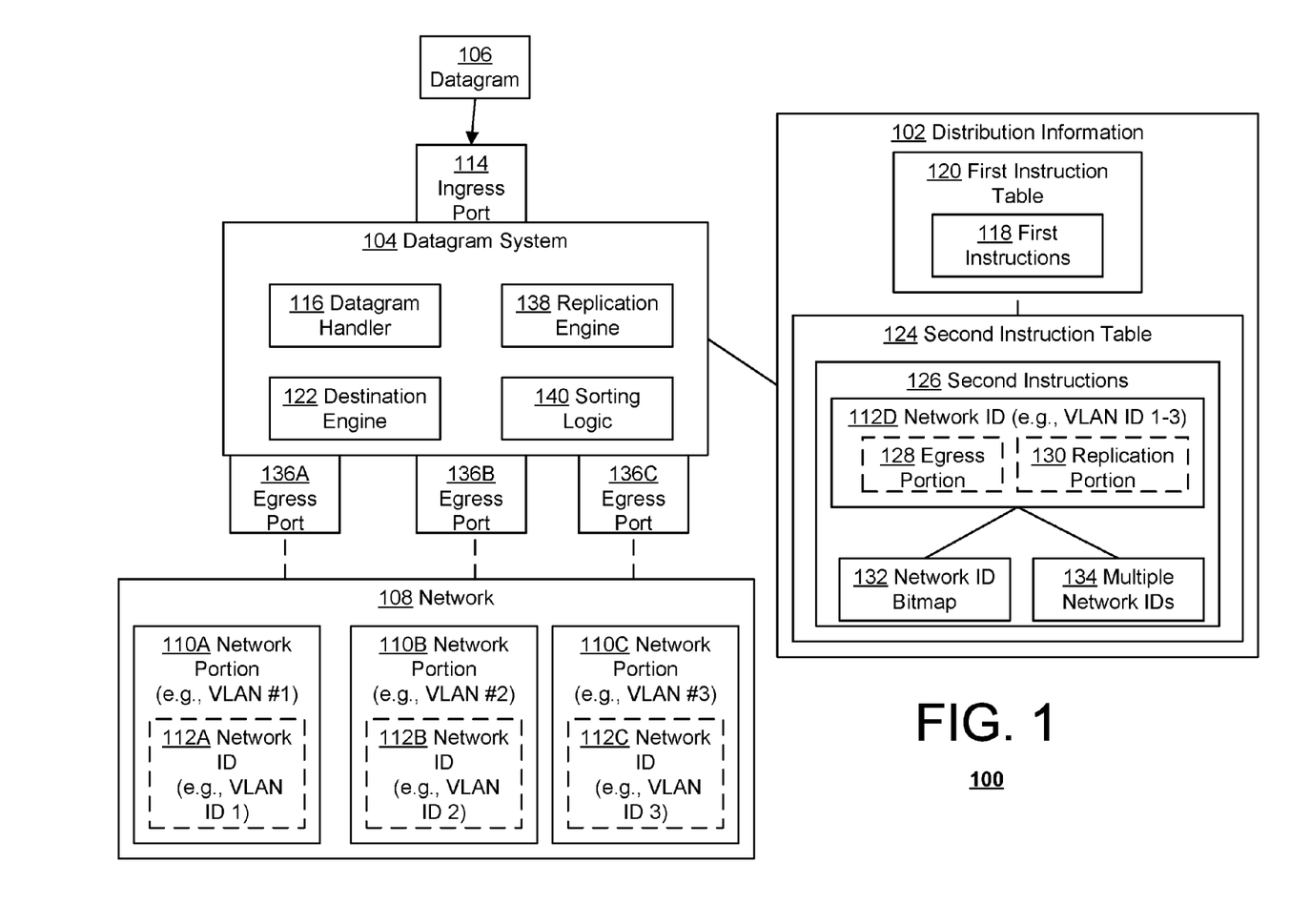
FIG. 1 is a block diagram of an example system for the compression of datagram distribution information, according to an example embodiment.

FIG. 1 is a block diagram of an example system 100 for the compression of datagram distribution information, according to an example embodiment. In the example of FIG. 1, the system 100 may store datagram distribution information 102 in a compressed manner utilizing multiple compression techniques. A datagram system 104 that may access the compressed information (e.g., 102), determine which compression technique has been used and distribute one or more datagrams 106, including replications thereof, to a network 108 based on the distribution information 102.

As just referenced, the system 100 may store the distribution information 102 in one or more manners of compression. The ability to utilize multiple compression and/or storage techniques may allow the system 100 to save on the memory or other storage allocation needed for storing the distribution information 102 by providing greater flexibility. The system 100 may then store the distribution information 102 using multiple compression or storage formats, thus optimizing the available storage space. The various compression formats may be selected, for example, based on the quantity and/or type of distribution information 102 to be stored. For example, the distribution information 102 may include overlapping and/or otherwise similar information, such as egress information, that may be combined and stored with other information to save space using the compression techniques.

The datagram system 104 may receive the datagram 106 and may determine which distribution information 102 is associated with routing the datagram 106 over the network 108. The datagram system 104 may then determine which compression technique was used to store the associated distribution information 102, extrapolate the necessary processing information for the datagram 106, and distribute the datagram 106, including replications thereof, accordingly.

The distribution information 102 may include any information related to processing and/or routing the datagram 106. The distribution information 102 may include, for example, information related to how many replications of the datagram 106 to make and to how to route each replication. The distribution information 102 may include other distribution and/or routing information as well including, for example, priority, security, encryption, error correction or other information that may be used for receiving, processing, replicating and/or transmitting the datagram 106. As referenced above, the datagram distribution information 102 may be stored in any of multiple compression and/or storage formats using various compression techniques.

The datagram system 104 may receive the datagram 106 and determine how to process and/or distribute the datagram 106 based on the distribution information 102. The datagram system 104 may, for example, read information from the datagram 106, such as header or other packet information. This header or packet information may include, for example, source, destination, priority or other processing/distribution/routing information about the datagram 106. Then for example, based on the header or datagram information read from the datagram 106, the datagram system 104 may determine from the distribution information 102 how to process the datagram 106 for distribution over the network 108. According to an example embodiment, the datagram system 104 may be implemented as or with an internet protocol multicast (IPMC) controller.

The datagram 106 may include a packet or other bundle of information that is to be distributed to or otherwise routed via the network 108. The datagram 106 may include, for example, a packet that is unicast, multicast or broadcast to one or more network devices or destinations connected to the network 108. According to an example embodiment, the datagram 106 may be multicast to multiple network destinations, such that each network destination is to receive a replication, copy or other image of the datagram 106. Then for example, the distribution information 102 may indicate to which destinations the replications of the datagram 106 are to be distributed.

The network 108 may include any network arranged to receive, transmit, distribute or otherwise route the datagram 106, including one or more replications thereof based on the distribution information 102. The network 108 may include or otherwise be connected to one or more destinations to which the replications of the datagram 106 are destined. For example, the network 108 may include one or more network portions 110A-C, such that one or more replications of the datagram 106 may be routed to the network portions 110A-C.

The network portions 110A-C may include any identifiable or distinguishable portions of the network 108. The network portions 110A-C may include, for example, virtual local area networks (e.g., VLANs #1-3) of the network 108 or network devices connected to the network 108. Each network portion 110A-C of the network 108 may be identified by a network identification or network identifier (network ID) 112A, 112B or 112C. The network IDs 112A-C may include any description or identification that corresponds to one or more of the network portions 110A-C and/or distinguishes the network portions 110A-C from one another. The network IDs 112A-C may include for example, unique network names, VLAN identifications (e.g., VLAN IDs 1-3), media access control (MAC) addresses or other identifications or descriptions of the network portions 110A-C.

The datagram system 104 may receive the datagram 106 via an ingress port 114. The ingress port 114 may include a physical or virtual connection or other portion of the datagram system 104 configured to receive the datagram 106. For example, the datagram system 104 may be implemented on a router, switch or other network device. Then for example, the network device may receive the datagram 106 via the ingress port 114 via a wired or wireless connection, such as a transmission control protocol (TCP) port or user datagram protocol (UDP) port.

A datagram handler 116 may process the received datagram 106. The datagram handler 116 may determine which of the distribution information 102 is associated with the datagram 106. For example, the datagram handler 116 may read header or other information from the datagram 106, compare the information from the datagram 106 to a first instruction table 120 of the distribution information 102 and determine a set of first instructions 118 associated with the datagram 106.

According to an example embodiment the distribution information 102 may be arranged into instruction tables, including the first instruction table 120 and a second instruction table 124. According to other example embodiments, the datagram distribution information 102 may be arranged into additional and/or other arrangements, other than the two instruction tables 120 and 124 provided as an example embodiment. The instruction tables 120 and 124 may include lookup tables where information that is determined from the datagram 106 and may be used to lookup the distribution information 102 stored in the tables 120 and 124.

The first instruction table 120 may include a table or other set of distribution information 102 relating to routing or processing the datagram 106. For example, the datagram handler 116 may read information from a header of the datagram 106. Then for example, the datagram handler 116 may look up the header information in the first instruction table 120 and determine that the first instructions 118 correspond to the datagram 106 header information. According to an example embodiment, the first instructions 118 may include a pointer or other identification of a first subset of the instructions (e.g., second instructions 126) from the second instruction table 124. In other example embodiments, the distribution information 102 may be consolidated into only the second instruction table 124.

The second instruction table 124 may include a table or other set of distribution information 102 relating to routing or processing the datagram 106. The second instruction table 124 may include one or more sets of second instructions 126 that indicate how many replications of the datagram 106 to make and how to route each replication (e.g., to which network portion 110A-C the replication is destined). For example, the second instructions 126 may include may include one or more network identifiers 112D to which the datagram 106 and/or one or more replications thereof are destined, wherein the stored network identifiers 112D (e.g., VLAN ID 1-3) may correspond to one or more of the network identifiers 112A-C (e.g., VLAN IDs 1-3). According to an example embodiment, the first instruction table 120 may include a Virtual Local Area Network (VLAN) Group Table and the second instruction table 124 may include a VLAN Table or VLAN Bitmap Table, wherein the first instructions 118 may point to or otherwise indicate the second instructions 126.

A destination engine 122 may determine which of the second instructions 126 of the second instruction table 124 are associated with routing the datagram 106. The second instructions 126, as referenced above, may include one or more subsets of instructions 126 related to the processing, replication, distribution and/or routing of the datagram 106. The destination engine 122 may determine, based on the second instructions 126, how many replications of the datagram 106 to make and to which network portions 110A-C each replication is to be routed. According to an example embodiment, the destination engine 122 may determine the second instructions 126 from the first instructions 118 (as determined by the datagram handler 116). Then for example, the second instructions 126 may point to additional instructions from the second instruction table 124 corresponding to additional routing information for the datagram 106.

The network identifiers 112D (as stored in the second instruction table 124) may include an egress portion 128 and a replication portion 130. The egress portion 128 may include an identification of one or more egress ports 136A-C to which replications of the datagram 106, as indicated by the replication portion 130, may be provided. The replication portion 130 may include an indication of how many replications of the datagram 106 are to be provided to the egress ports 136A-C as indicated by the egress portion 128.

According to an example embodiment, the egress portion 128 and the replication portion 130 may together indicate a network identifier 112D that corresponds to one of the network identifiers 112A-C of the network portions 110A-C, respectively, to which to provide a replication of the datagram 106. For example, the egress portion 128 may include a most significant byte (MSB) that corresponds to one of the egress ports 136A-C, and the replication portion 130 may include least significant bits (LSB) that indicate how many replications of the datagram 106 to produce. The datagram system 104 may then provide the replications of the datagram 106, as determined from the LSB, to the corresponding network portion 110A-C through the appropriate egress port 136A-C, as determined from the MSB, wherein the MSB and LSB when combined or otherwise taken together may correspond to one or more of the network identifiers 112A-C.

The second instructions 126 may include one or more stored network identifiers 112D that correspond to one or more of the network identifiers 112A-C. The network identifiers 112D may be stored as a network identifier bitmap 132 or as multiple network identifiers 134. The network identifier bitmap 132 and the multiple network identifiers 134 may correspond to two varying storage and/or compression formats used by the system 100 to store the distribution information 102 in the second instruction table 124. According to an example embodiment, each entry of the second instruction table 124 may include multiple network identifiers (e.g., 112A-C) stored in any one of multiple compression formats (e.g., 132 or 134).

For example, the second instruction table 124 may include a finite number of entries (e.g., based on the memory/storage space available). Then for example, each entry of the second instruction table 124 may include either the network identifier bitmap 132 or the multiple network identifiers 134, based on varying compression techniques. According to other example embodiments, other compressions formats or techniques may be used to store the distribution information 102 in the second instruction table 124.

The network identifier bitmap 132 may include the egress portion 128 and the replication portion 130. The replication portion 130 (of the network identifier bitmap 132) may include multiple bits, that when set, each indicate a replication of the datagram 106 that is to be made. Then for example, within the network identifier bitmap 132, the multiple replications of the datagram 106 may each be provided to the same egress port 136A-C as indicated by the egress portion 128. According to an example embodiment, the combination of the egress portion 128 and each set bit from the replication portion 130 may correspond to a different network identifier 112A-C to which to route a single replication of the datagram 106. Thus the network identifier bitmap 132 may include multiple network identifiers 112D, each corresponding to a different set bit within the replication portion 130 and each destined for the egress port 136A-C as indicated by the egress portion 128.

The multiple network identifiers 134 when used to store the second instructions 126 may include multiple or several individual network identifiers 112D, each network identifier 112D may include a different egress portion 128. Each network identifier 112D amongst the multiple network identifiers 134 may correspond to an individual network identifier 112A-C to which to transmit a single replication of the datagram 106. Then for example, the destination engine 122 may determine which of the network identifiers 112D of the multiple network identifiers 134 correspond or are otherwise associated with a replication of the datagram 106.

As just noted, the network identifier bitmap 132 and the multiple network identifiers 134 may vary in that the network identifier bitmap 132 may indicate a single egress (e.g., egress port 136A-C) to which multiple replications of the datagram 106 are destined. The multiple network identifiers 134, by contrast, may each correspond to a single egress to which a single replication of the datagram 106 is destined. In other example embodiments, other storage and/or compression techniques, including but not limited to the network identifier bitmap 132 and the multiple network identifiers 134 may be used to store the distribution information 102.

The datagram system 104 may include one or more egress ports 136A-C. The egress ports 136A-C may include physical or virtual connections configured to transmit or route the datagram 106, including replications thereof, to the network 108 and/or network portions 110A-C. For example, the datagram system 104 may be implemented on a router, switch or other network device. Then for example, the network device may route the datagram 106 through the egress ports 136A-C which may include a wired or wireless connection, such as a transmission control protocol (TCP) port or user datagram protocol (UDP) port. According to an example embodiment, the egress ports 136A-C may include a line driver or transceiver to transmit the replications to the network 108.

A replication engine 138 may provide replications of the datagram 106 to the appropriate egress ports 136A-C as determined from the distribution information 102. According to an example embodiment, the replication engine 138 may replicate the datagram 106 the requisite number of times (as indicated by the replication portion 130 of the network identifier 112D).

Sorting logic 140 may arrange the distribution information 102 into the first and second instruction tables 120 and 124. The sorting logic 140 may determine all the network identifiers 112A-C of the accessible network portions 110A-C of the network 108. Then for example, based on the overlap of the egress ports 136A-C (e.g., egress portion 128), the sorting logic 140 may store the network identifiers 112A-C in the second instruction table 124 as either a network identifier bitmap 132 or as multiple network identifiers 134.

The system 100 may conserve the space or memory needed to store distribution information 102 for routing datagrams 106. The system 100 may include the flexibility to choose amongst several compression formats, including the network identifier bitmap 132 and the multiple network identifiers 134, to store the distribution information 102 as determined from the network 108. Then for example, upon receiving the datagram 106, the datagram system 104 may determine which compression format (e.g., 132 or 134) was used to store the distribution information 102 and use the distribution information 102 to replicate and route the datagram 106 accordingly.

Figure 2A:
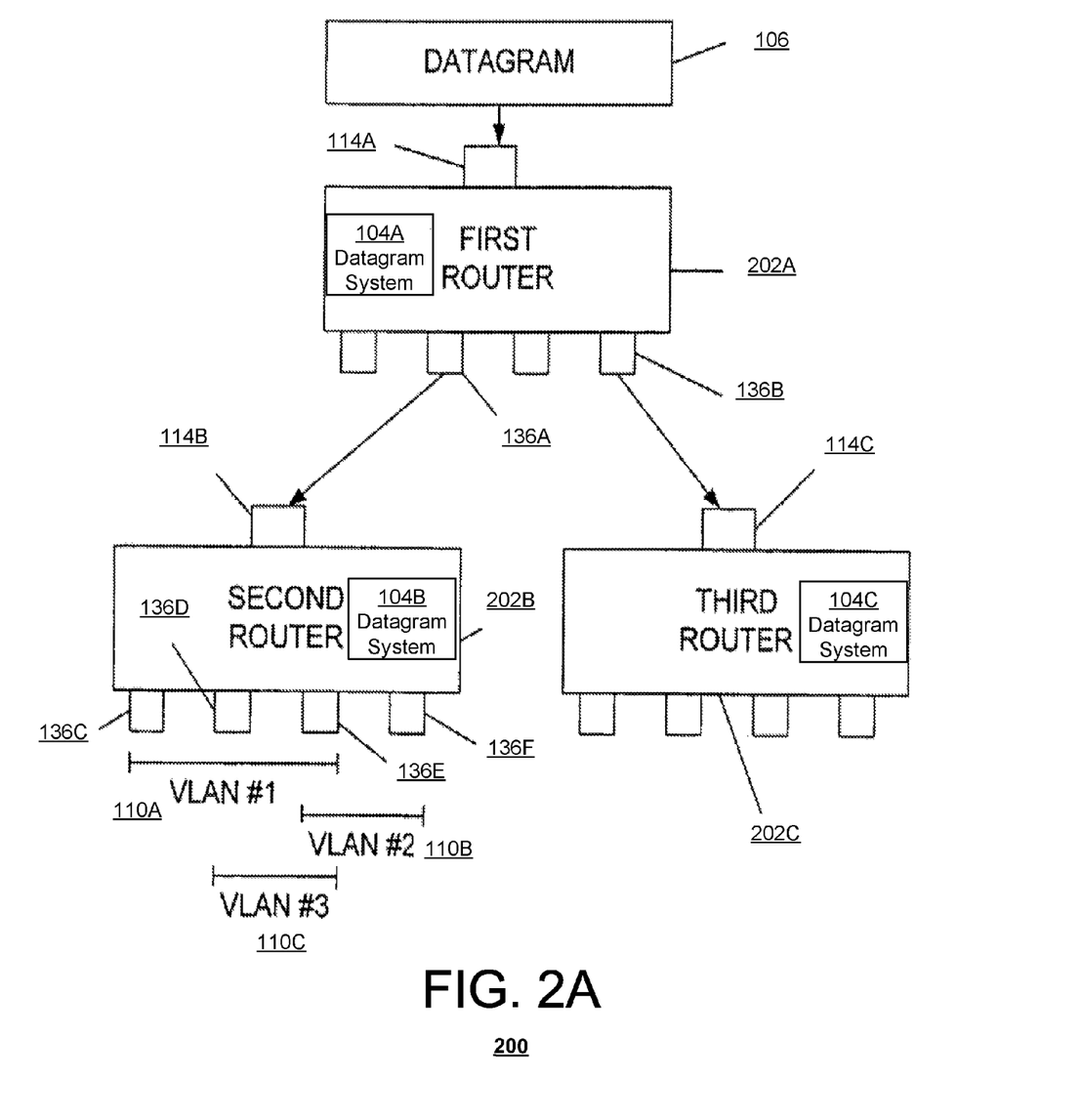
FIG. 2A is a block diagram of an example environment in which the datagram system of FIG. 1 may be implemented, according to an example embodiment.

FIG. 2A is a block diagram of an example environment 200 in which the datagram system 104 of FIG. 1 may be implemented, according to an example embodiment. The system 200 may include multiple routers 202A-C. The routers 202A-C may include any network device capable of receiving and routing the datagram 106, including replications thereof, appropriately. The routers 202A-C may each include an implementation of the datagram system 104A-C, including the distribution information 102.

The datagram 106 may be received by a first router 202A via the ingress port 114A. The datagram system 104A may determine (e.g., from the distribution information 102) that the datagram 106 is to be transmit via egress ports 136A and 136B to the second router 202B and the third router 202C, respectively. Then for example, the router 202A may replicate the datagram 106 as necessary and provide or route the replications via the egress ports 136A and 136B.

The third router 202C, as shown, may determine (e.g., from the distribution information 102) that no more replications of the datagram 106 are to be transmit from this router 202C and thus additional replications of the datagram 106 may be produced. The datagram system 104B may determine that replications of the datagram 106 are to be provided via the egresses 136C-F to the VLANs 110A-C. Example processing of the datagram 106 by the second router 202B is shown in greater detail in FIGS. 2B-2D.

Figure 2B:
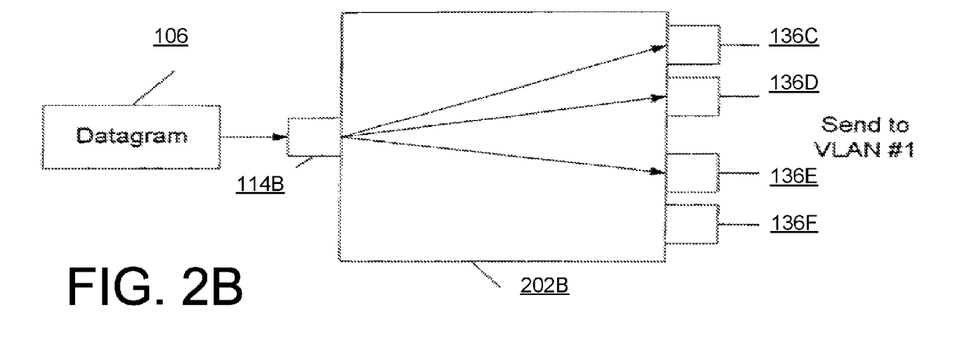
FIG. 2B is a block diagram illustrating an exemplary processing of a datagram, according to an example embodiment.

FIG. 2B is a block diagram illustrating an exemplary processing of a datagram 106, according to an example embodiment. In the example of FIG. 2B, the datagram 106 may be routed to VLAN #1 (110A), in which egress ports 136C, D and E each are connected to the VLAN #1. Then for example, the router 202B may replicate the datagram 106 three times and route the replications to the egress ports 136C, D and E as shown.

Figure 2C:
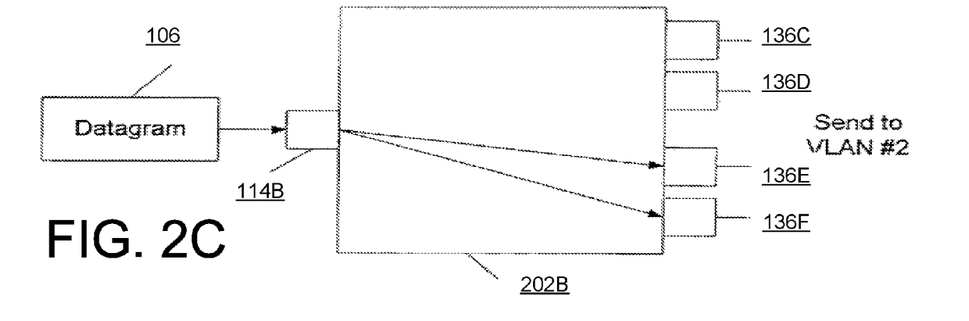
FIG. 2C is a block diagram illustrating an exemplary processing of a datagram, according to an example embodiment.

FIG. 2C is a block diagram illustrating an exemplary processing of a datagram 106, according to an example embodiment. In the example of FIG. 2C, the datagram 106 may be routed to VLAN #2 (110B), in which egress ports 136E and F each are connected to the VLAN #2. Then for example, the router 202B may replicate the datagram 106 two times and route the replications to the egress ports 136E and F as shown.

Figure 2D:
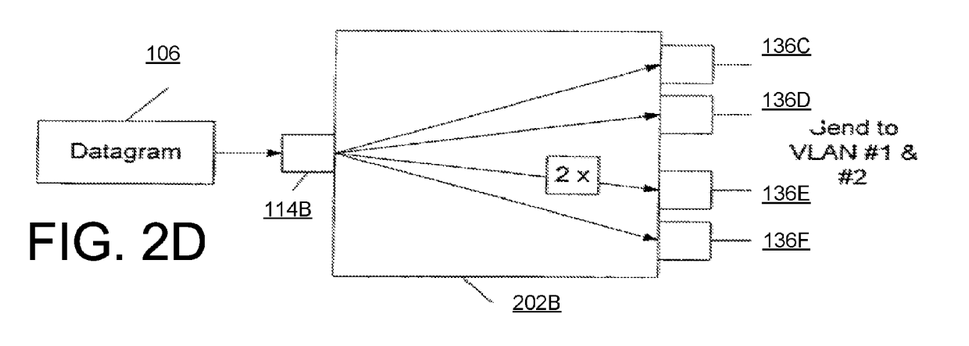
FIG. 2D is a block diagram illustrating an exemplary processing of a datagram, according to an example embodiment.

FIG. 2D is a block diagram illustrating an exemplary processing of a datagram 106, according to an example embodiment. In the example of FIG. 2B, the datagram 106 may be routed to VLAN #1 (110A) and VLAN #2 (110B), in which egress ports 136C, D and E each are connected to the VLAN #1 and egress ports 136E and F are each connected to the VLAN #2. Then for example, the router 202B may replicate the datagram 106 five times and route the replications to the egress ports 136C, D, E and F as shown. As may be seen in the example of FIG. 2D, the egress port 136E may receive two replications of the datagram 106, a first replication destined for VLAN #1 and a second replication destined for VLAN #2.

Figure 3:
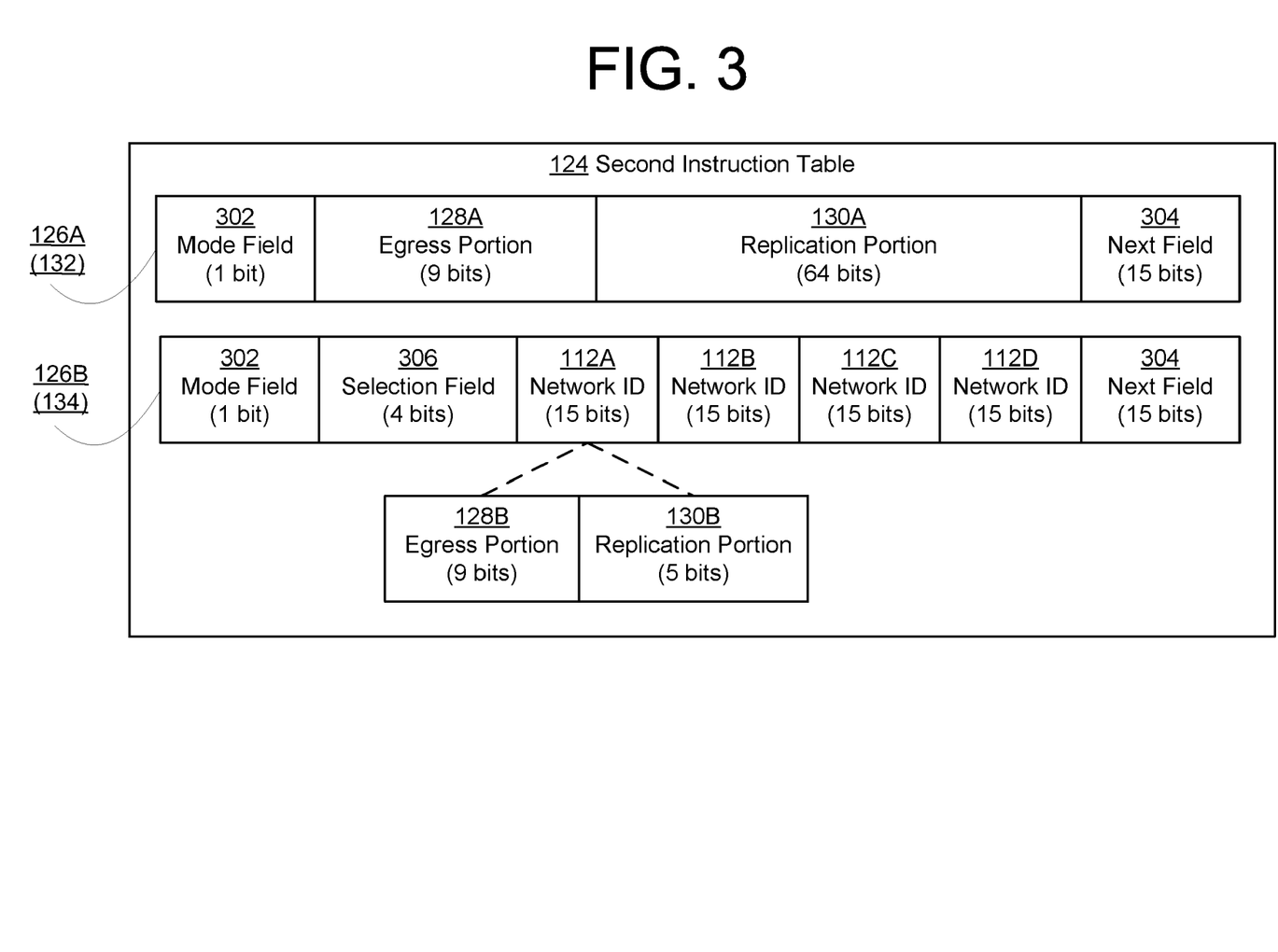
FIG. 3 is a block diagram of an example block diagram of the second instruction table of FIG. 1, according to an example embodiment.

FIG. 3 is a block diagram of an example block diagram of the second instruction table 124 of FIG. 1, according to an example embodiment. The second instruction table 124 may include two entries 126A and 12B. The first subset of second instructions 126A may be stored as a network identifier bitmap 132 and the second subset of second instructions 126B may be stored as multiple network identifiers 134. According to an example embodiment, the entries 126A and 126B (of distribution information 102) may be stored in second instruction table 124 within a finite number of bits. The example of FIG. 3 shows an exemplary implementation as to how the distribution information 102 may be stored using the varying compression techniques 132 and 134. It should be understood that the example of FIG. 3, is exemplary and other embodiments may include additional and/or different fields of varying bit lengths, other than those shown.

As just referenced, the entry 126A may include a network identifier bitmap 132 compression. The network identifier bitmap 132 may include a mode field 302, an egress portion 128A, a replication portion 130A and a next field 304. The multiple network identifiers 134 may include a mode field 302, a selection field 306, four individual network identifiers 112A-D and a next field 304

The mode field 302, as included in both the network identifier bitmap 132 and the multiple network identifiers 134, may indicate which compression or storage technique is used to store the distribution information (e.g., 102 from FIG. 1) in the entries 126A and 126B of the second instruction table 124. For example, the mode field 302 may include a single bit field that if set (e.g., with the value of "1") indicates that the entry 126B includes the multiple network identifiers 134 compression. Then for example, if the mode field 302 is "0" it may indicate that the entry 126A includes a network identifier bitmap 132. In other example embodiments, in which the second instruction table 124 includes other or additional compression techniques, the mode field 302 may be expanded (e.g., by allocating more bits) to include an indication for each compression technique.

The egress portion 128A, as described with reference to FIG. 1, may correspond to an egress port to which replications of a datagram (e.g., 106) are to be routed. The egress portion 128A may include a 9 bit sequence of bits corresponding to one or more of the egress ports (e.g., 136A-C of FIG. 1).

The replication portion 130A, as described above, may be used to determine how many replications of a datagram (e.g., 106) to make. For example, the replication portion 130 may include a 64 bit sequence, where each set bit (e.g., bit set to "1") in the replication portion 130 may indicate a replication of a datagram to be made. Thus, if the replication portion includes 8 set bits, then 8 replications of the datagram are to be provided to the egress port as indicated by the egress portion 128.

The position of the set bits within the replication portion 130A may indicate to which network portion (e.g., 110A-C of FIG. 1) each replication is destined. For example, the egress portion 128A when taken with a set bit of the replication portion 130A may indicate a network identifier (e.g., 112A-C of FIG. 1) to which to route a replication of a datagram. For example, if the $1^{st}$ bit is set it may indicate a first network identifier (e.g., 112A of FIG. 1) and if the $63^{rd}$ bit is set it may indicate a second identifier (e.g., 112B of FIG. 1). Thus, the network identifier bitmap 132, in the example of FIG. 3, may include up to 64 network identifiers 112, one for each available bit of the replication portion 130A.

The multiple network identifiers 134 may include multiple individual network identifiers 112A-D, as shown. Each network identifier 112A-D of the multiple network identifiers 134 may include an egress portion 128B and a replication portion 130B. The egress portion 130B may be similar to the egress portion 130A, and may indicate an egress (e.g., 136A-C) to which to provide a replication of the datagram.

The replication portion 130B, as shown, may include 5 bits instead of the 64 bits as shown for the replication portion 130A. As referenced above, each network identifier 112A-D of the multiple network identifiers 134 may correspond to only a single replication of a datagram. Thus, because the replication portion 130B may indicate only a single replication of a datagram, rather than multiple replications as indicated by the replication portion 130A, the replication portion 130B may be stored as a binary number. The binary number (of the replication portion 130B) may indicate a 'set bit' (of value "1") if translated into a bitmap (of replication portion 130A). For example, the replication portion 130B with value "01000" may translate into a replication portion 130A with bit 2 being set. In translating the binary replication portion 130A, the destination engine 122 may determine which bit of the replication portion 130A would be set if the network identifier 112A-D was stored as a bitmap (e.g., 132).

As shown in the example of FIG. 3, the multiple network identifiers 134 may include four individual network identifiers 112A-D. In other example embodiments, the multiple network identifiers 134 may include more or less network identifiers 112A-D in a single entry (which may depend on the number of available bits of the second instruction table 124).

According to an example embodiment, the sorting logic 140 (of FIG. 1) may store multiple network identifiers 112 as multiple network identifiers 134 even two or more of the stored network identifiers 112A-D share the same egress portion 128B. For example, it may be more space efficient to store three individual network identifiers 112A-C as multiple individual network identifiers 134 rather than as a network identifier bitmap 132, even if the network identifiers 112A-C share a common egress portion 128B. Because storing the network identifiers 112A-C individually (e.g., 134), may allow the second instruction table 124 to store them in a single entry 126B and still have space for another individual network identifier 112D with a different egress portion 128B, thus saving memory used by reducing the number of entries of the second instruction table 124 that need to be allocated.

The entries 126A and 126B may each also include a next field 304. The next field 304 may indicate whether the entry (e.g., 126A, 126B) is the final entry of the second instruction table 124 associated with a datagram or whether there is another entry (with additional network identifiers 112) that is to be referenced with regards to routing the datagram.

The selection field 306, as included in the multiple network identifiers 134, may indicate which of the network identifiers 112A-D are associated with a particular datagram. For example, the selection field 306 may include 4 bits, wherein each bit may correspond to one of the network identifiers 112A-D. Then for example, if the first and third bits of the selection field 306 are set (e.g., to value "1"), then the datagram being processed may need to be replicated and routed as indicated by the network identifiers 112A and 1112C.

Figure 4:
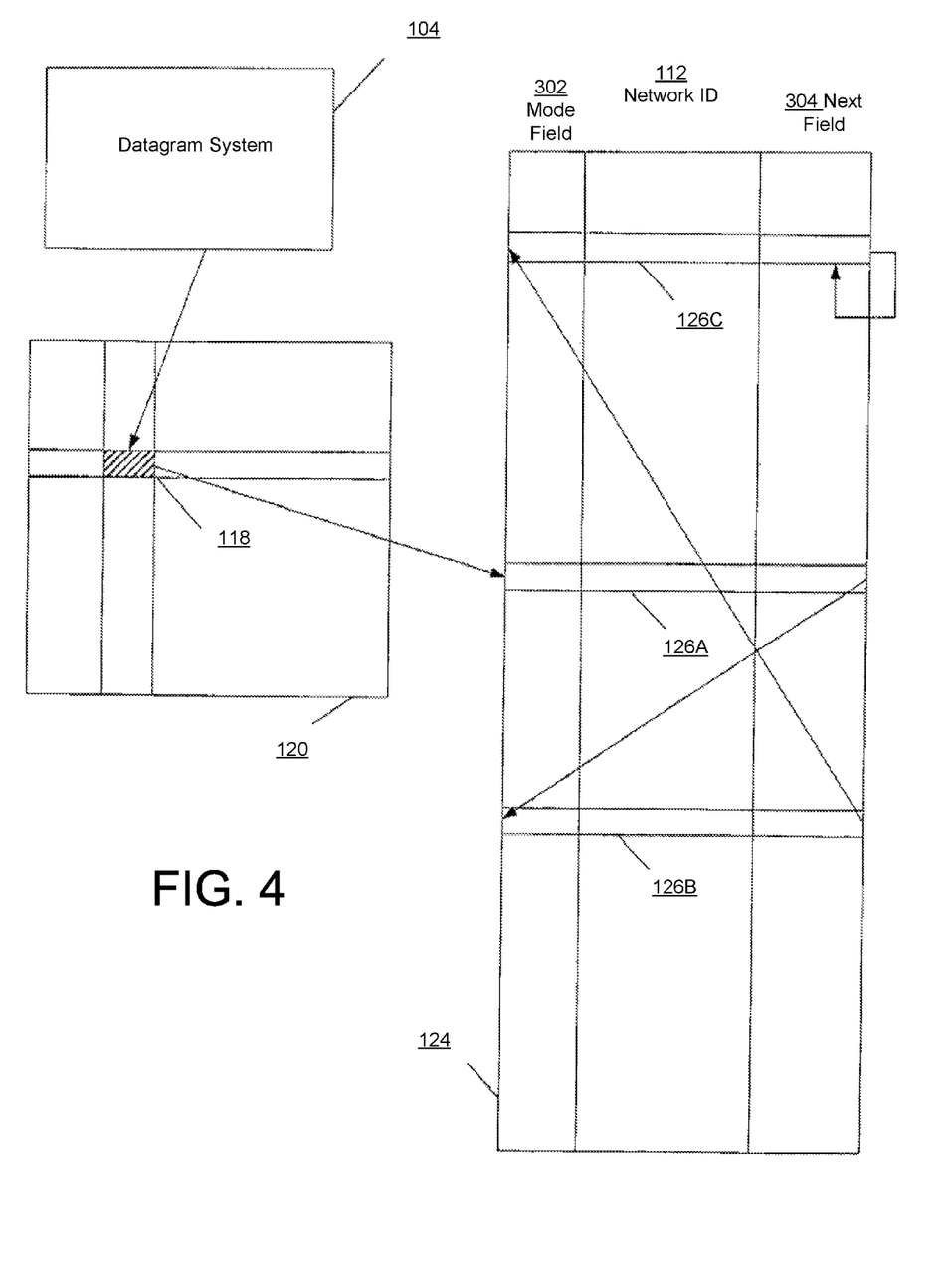
FIG. 4 is a block diagram showing example operations of the system of FIG. 1, according to an example embodiment.

FIG. 4 is a block diagram showing example operations of the system 100 of FIG. 1, according to an example embodiment. In the example of FIG. 4, the datagram system 104 which may be implemented on an IPMC controller may determine from the first instruction table 120 (e.g., a VLAN group table), the first set of instructions 118 associated with a datagram. Then for example, the first instructions 118 may point to a second set of instructions 126A from the second instruction table 124 (e.g., a VLAN bitmap table). The next field 304 of the first subset of the second instructions 126A may point to or indicate the second subset of instructions 126B are to be referenced, which may in turn point to the third and final set of instructions 126C. Each entry or subset 126A-C of the second instructions table 124 may include either a network identifier bitmap 132 or multiple network identifiers 134 as indicated by the mode field 302.

Figure 5:
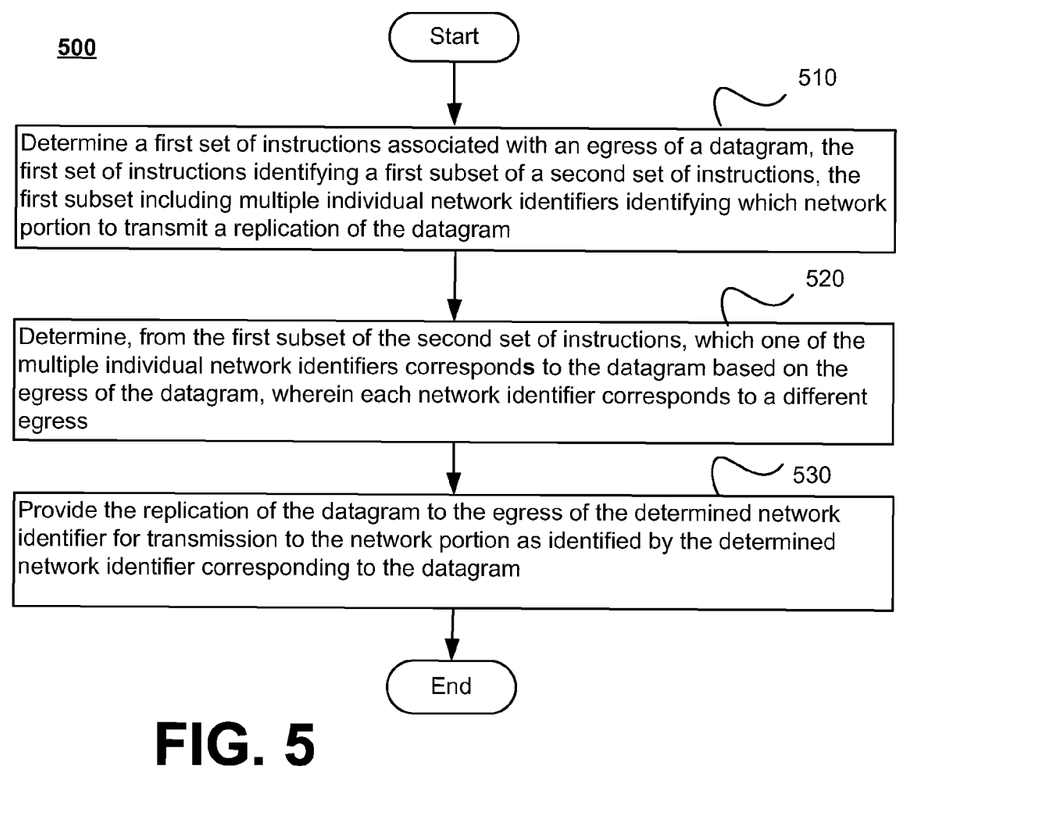
FIG. 5 is a flowchart illustrating example operations of the system of FIG. 1.

FIG. 5 is a flowchart 500 illustrating example operations of the system of FIG. 1. More specifically, FIG. 5 illustrates an operational flow 500 representing example operations related to the compression of datagram distribution information.

After a start operation, a first set of instructions associated with an egress of a datagram may be determined, the first set of instructions identifying a first subset of a second set of instructions, the first subset including multiple individual network identifiers identifying which network portion to transmit a replication of the datagram (510). For example, as shown in FIG. 1, the datagram handler 116 may determine the first instructions 118 associated with an egress port 136A-C of the datagram 106, the first set of instructions 118 identifying the second instructions 126 of the second instruction table 124, the second instructions including the multiple network identifiers 134 identifying which network portion 110A-C to transmit a replication of the datagram 106.

From the first subset of the second set of instructions, which one of the multiple individual network identifiers corresponds to the datagram may be determined based on the egress of the datagram, wherein each network identifier corresponds to a different egress (520). For example, as shown in FIG. 3, the destination engine 122 (FIG. 1) may determine from the selection field 306 which of the network identifiers 112A-D corresponds to the datagram 106 based on the egress of the datagram 106, wherein each network identifier 112A-D corresponds to a different egress (e.g., 136A-C of FIG. 1).

The replication of the datagram may be provided to the egress of the determined network identifier for transmission to the network portion as identified by the determined network identifier corresponding to the datagram (530). For example, the replication engine 138 of FIG. 1 may provide a replication of the datagram 106 to the egress 136A of the determined network identifier 112D for transmission to the network portion 110B as identified by the determined network identifier 112D corresponding to the datagram 106.

Figure 6:
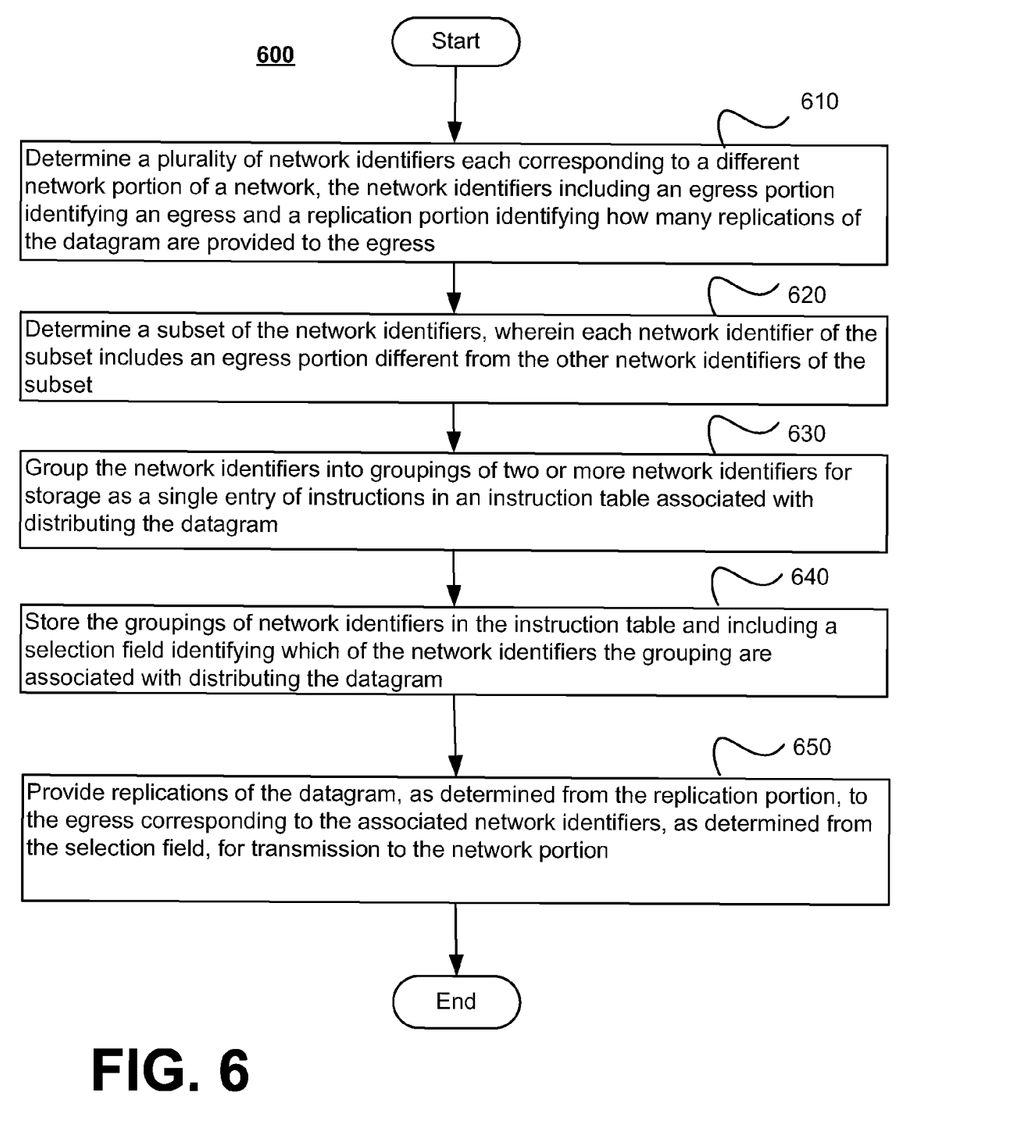
FIG. 6 is a flowchart illustrating example operations of the system of FIG. 1.

FIG. 6 is a flowchart 600 illustrating example operations of the system of FIG. 1. More specifically, FIG. 6 illustrates an operational flow 600 representing example operations related to the compression of datagram distribution information.

After a start operation, a plurality of network identifiers each corresponding to a different network portion of a network may be determined, the network identifiers including an egress portion identifying an egress and a replication portion identifying how many replications of the datagram are provided to the egress (610). For example, as shown in FIG. 1, the sorting logic 140 may determine the network identifiers 112A-C corresponding to the network portions 110A-C of the network 108, the network identifiers 112A-C including an egress portion 128 identifying an egress 136A-C and a replication portion 130 identifying how many replications of the datagram 106 are provided to the egress 136A-C.

A subset of the network identifiers may be determined wherein each network identifier of the subset includes an egress portion different from the other network identifiers of the subset (620). For example, the sorting logic 140 may determine a subset of the network identifiers 112A-C wherein each network identifier 112A-C of the subset includes the egress portion 128 that is different from the other network identifiers 112A-C of the subset.

The network identifiers may be grouped into groupings of two or more network identifiers for storage as a single entry of instructions in an instruction table associated with distributing the datagram (630). For example, the sorting logic 140 (of FIG. 1) may store, as shown in FIG. 3, multiple network identifiers 112A-C as a single entry 126B in the second instruction table 124.

The groupings of network identifiers may be stored in the instruction table and including a selection field identifying which network identifiers of the grouping are associated with distributing the datagram (640). For example, as shown in FIG. 3, the multiple network identifiers 134 may include the selection field 306 identifying which network identifiers 112A-D are associated with distributing a datagram (e.g., 106 of FIG. 1).

Replications of the datagram, as determined from the replication portion, may be provided to the egress corresponding to the associated network identifiers, as determined from the selection field, for transmission to the network portion. (650). For example, the replication engine 138 may provide replications of the datagram 106, as determined from the replication portion 130 to the egresses 136A-C for transmission to the network portions 110A-C corresponding to the associated network identifiers 112A-C, based on the selection field (306 of FIG. 3) identifying which network identifier (112A-D of FIG. 3) is associated with distributing the datagram 106.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus comprising a processor, the processor configured to:
   determine a first set of instructions associated with an egress of a datagram, the first set of instructions identifying a first subset of a second set of instructions, the first subset including multiple individual network identifiers identifying which network portion to transmit a replication of the datagram;
   determine, from the first subset of the second set of instructions, which one of the multiple individual network identifiers corresponds to the datagram based on the egress of the datagram, wherein each network identifier corresponds to a different egress; and
   provide the replication of the datagram to the egress of the determined network identifier for transmission to the network portion as identified by the determined network identifier corresponding to the datagram.

2. The apparatus of claim 1, wherein the processor being configured to determine a first set of instructions comprises the processor configured to:
   receive the datagram; and
   determine the egress of the datagram from a header portion of the datagram.

3. The apparatus of claim 1, wherein the processor being configured to determine a first set of instructions comprises the processor configured to determine a pointer to the first subset of the second set of instructions.

4. The apparatus of claim 1, wherein the processor being configured to determine a first set of instructions comprises the processor configured to determine, based on a mode field associated with the first subset of the second set of instructions, whether the first subset includes the multiple individual network identifiers with differing egresses or a network identifier bitmap including multiple network identifiers with a shared egress.

5. The apparatus of claim 1, wherein the processor being configured to determine a first set of instructions comprises the processor configured to determine a first entry in the first set of instructions including multiple individual virtual local area network (VLAN) identifiers identifying to which VLAN of the network to transmit a replication of the datagram.

6. The apparatus of claim 1, wherein the processor is further configured to:
   determine from the first subset of the second set of instructions one or more additional subsets of the second set of instructions associated with the datagram.

7. The apparatus of claim 6, wherein the processor is further configured to:
   determine for each of the additional subsets of the second set of instructions an egress to which to provide one or more additional replications of the datagram.

8. An apparatus for distributing a datagram over a network, the apparatus comprising:
   one or more egress ports configured to transmit replications of a datagram to one or more network portions of a network, each network portion of each egress port being identified by a network identifier;
   a destination engine configured to:
      determine whether a first set of instructions associated with the datagram includes a network identifier bitmap or multiple individual network identifiers, and
      determine from each network identifier how many replications of the datagram to generate and to which network portion of which egress port to provide each replication, wherein the network identifier bitmap identifies a single egress port to which to provide multiple replications of the datagram, and each of the multiple individual network identifiers identifies a single egress to which to provide a single replication of the datagram; and a replication engine configured to provide replications of the datagram to one of the egress ports based on the network identifiers.

9. The apparatus of claim 8 wherein if the first set of instructions includes the multiple individual network identifiers, the destination engine is configured to:

determine, based on a selection field, which of the multiple individual network identifiers is associated with the datagram; and determine, based on an egress portion of the associated network identifier, to which of the egress ports a replication of the datagram is routed.

10. The apparatus of claim 8 wherein if the first set of instructions includes the network identifier bitmap, the destination engine is configured to:

determine how many replications of the datagram to make from a replication portion of the network identifier bitmap;

identify the single egress port of the network identifier bitmap based on an egress portion of network identifier bitmap; and determine a network identifier for each replication of the datagram based on the egress portion and the replication portion of the network identifier bitmap.

11. The apparatus of claim 8 further comprising a datagram handler configured determine a second set of instructions from a second instruction table, the second set of instructions being associated with the datagram and identifying the first set of instructions.

12. The apparatus of claim 8 wherein the destination engine is configured to determine from a mode field of the first instruction table whether the first set of instructions includes the network identifier bitmap or the multiple individual network identifiers.

13. The apparatus of claim 8 wherein the destination engine is configured to determine how many replications of the datagram to generate from a replication portion of the network identifier bitmap, wherein a set bit in the replication portion corresponds to a replication of the datagram.

14. The apparatus of claim 8 wherein the destination engine is configured to determine one or more additional sets of instructions associated with the datagram based on a next field of the first set of instructions.

15. The apparatus of claim 8 wherein the replication engine is configured to replicate the datagram.

16. The apparatus of claim 8 wherein the destination engine is configured to determine from the network identifier bitmap or the multiple individual network identifiers, to which virtual local area network (VLAN) identifiers to provide one or more replications of the datagram, wherein each VLAN identifier corresponds to a VLAN associated with one or more of the egress ports.

17. The apparatus of claim 8 wherein the destination engine is configured to determine that each of the multiple individual network identifiers identifies a different network portion corresponding to one or more of the egress ports for a single replication of the datagram.

18. A method of distributing a datagram over a network, the method comprising:

determining a plurality of network identifiers each corresponding to a different network portion of a network, the network identifiers including an egress portion identifying an egress and a replication portion identifying how many replications of the datagram are provided to the egress;

determining a subset of the network identifiers, wherein each network identifier of the subset includes an egress portion different from the other network identifiers of the subset;

grouping the network identifiers into groupings of two or more network identifiers for storage as a single entry of instructions in an instruction table associated with distributing the datagram;

storing the groupings of network identifiers in the instruction table and including a selection field identifying which of the network identifiers of the grouping are associated with distributing the datagram; and providing replications of the datagram, as determined from the replication portion, to the egress corresponding to the associated network identifiers, as determined from the selection field, for transmission to the network portion.

19. The method of claim 18 wherein the storing comprises:

storing a first grouping of network identifiers with differing egress portions with the selection field identifying which of the network identifiers of the first grouping is associated with the datagram in a first entry of the instruction table; and storing a second grouping of network identifiers with identical egress portions in a second entry of the instruction table, the second set of identifiers being stored as a network identifier bitmap.

20. The method of claim 18 wherein the providing comprises:

receiving the datagram;

determining an egress of the datagram;

determining a first instruction set based on the egress, the first instruction set pointing to a first grouping of the network identifiers stored in the instruction table;

determining which network identifier of the first grouping is associated with the datagram;

determining which egress to provide replications of the datagram based on the egress portion and replication portion of the determined network identifier, respectively; and providing the identified replications of the datagram to the determined egress.

* * * * *

UNITED STATES PATENT AND TRADEMARK OFFICE
CERTIFICATE OF CORRECTION

| | | |
|---|---|---|
| PATENT NO. | : 7,953,086 B2 | Page 1 of 1 |
| APPLICATION NO. | : 12/399618 | |
| DATED | : May 31, 2011 | |
| INVENTOR(S) | : Weitong Chuang et al. | |

It is certified that error appears in the above-identified patent and that said Letters Patent is hereby corrected as shown below:

In column 13, line 30, in claim 11, after "configured" insert -- to --.

Signed and Sealed this
Nineteenth Day of July, 2011

David J. Kappos
*Director of the United States Patent and Trademark Office*